(12) United States Patent
Rochette et al.

(10) Patent No.: US 8,707,274 B2
(45) Date of Patent: Apr. 22, 2014

(54) SYSTEM AND METHOD FOR INFORMATION EXTRACTION FROM WITHIN AN ACTIVE APPLICATION DURING EXECUTION

(75) Inventors: Donn Rochette, Fenton, IA (US); Ilho Ye, Tenafly, NJ (US)

(73) Assignee: Appfirst, Inc., New York, NY (US)

( * ) Notice: Subject to any disclaimer, the term of this patent is extended or adjusted under 35 U.S.C. 154(b) by 267 days.

(21) Appl. No.: 13/083,311

(22) Filed: Apr. 8, 2011

(65) Prior Publication Data

US 2011/0252407 A1    Oct. 13, 2011

Related U.S. Application Data

(60) Provisional application No. 61/322,753, filed on Apr. 9, 2010.

(51) Int. Cl.
*G06F 9/44*    (2006.01)

(52) U.S. Cl.
USPC .......................................................... 717/128

(58) Field of Classification Search
None
See application file for complete search history.

(56) References Cited

U.S. PATENT DOCUMENTS

| | | | | |
|---|---|---|---|---|
| 4,783,762 | A * | 11/1988 | Inoue et al. | 714/45 |
| 6,263,302 | B1 * | 7/2001 | Hellestrand et al. | 703/17 |
| 6,275,877 | B1 * | 8/2001 | Duda | 710/23 |
| 6,282,701 | B1 * | 8/2001 | Wygodny et al. | 717/125 |
| 6,321,324 | B1 * | 11/2001 | Le Van Suu | 712/34 |
| 6,530,078 | B1 * | 3/2003 | Shmid et al. | 717/138 |
| 7,689,998 | B1 * | 3/2010 | Chrysanthakopoulos | 718/104 |
| 8,381,191 | B2 * | 2/2013 | Mondal | 717/127 |
| 2003/0035430 | A1 * | 2/2003 | Islam et al. | 370/401 |
| 2004/0133793 | A1 * | 7/2004 | Ginter et al. | 713/193 |
| 2007/0268121 | A1 * | 11/2007 | Vasefi et al. | 340/506 |
| 2008/0120592 | A1 * | 5/2008 | Tanguay et al. | 717/104 |

OTHER PUBLICATIONS

Hunt et al., "Detours: Binary Interception of Win32 Functions", Proceedings of the 3rd USENIX Windows NT Symposium. Seattle, WA, Jul. 1999.
Ayyangar et al., "System Call Inherit in Linux", http://www.cr.sunysb.edu/~arvind/readme, Dec. 15, 2008.
Osman et al., "The Design and Implementation of Zap: A System for Migrating Computing Environments", Proceedings of the 5th Symposium on Operating Systems Design and Implementation (OSDI 2002), Boston, MA, Dec. 2002.
"Execution Trace Analysis of OS/2 2. DLLS Using an Intercept Layer", IBM Technical Disclosure Bulletin, International Business Machines Crop. (Thornwood), U.S., vol. 37, No. 3, pp. 373-375, Mar. 1, 1994.
EP Search Report for corresponding EP application No. 11161933.

* cited by examiner

*Primary Examiner* — Don Wong
*Assistant Examiner* — Daxin Wu
(74) *Attorney, Agent, or Firm* — Matthew A. Pequignot; Pequignot + Myers LLC

(57) ABSTRACT

A system and method for providing detailed information about how a software application is running has a processor and memory including a shared memory. The method provides an automated way of extracting information from a first software application having a plurality of libraries as the application executes. A special library used to interrogate an execution application is placed in the execution path but does not use I/O resources while it is extracting information about an executing software application. An intercept causes the special library to execute, and information is seamless provided to an output device during execution of the interrogated application.

14 Claims, 8 Drawing Sheets

App Stack in a System Model
PRIOR ART

SYSTEM AND METHOD FOR INFORMATION EXTRACTION FROM WITHIN AN ACTIVE APPLICATION DURING EXECUTION

CROSS-REFERENCE TO RELATED APPLICATIONS

The present invention claims priority from U.S. Provisional Patent Application No. 61/322,753 filed Apr. 9, 2010, which is incorporated herein by reference.

A computer program listing appendix is submitted herewith via the United States Patent Office Electronic Filing System. All of the material submitted herewith is incorporated herein by reference. The computer program listing appendix includes one file. The name of the file, the date of creation of that file, and its size in bytes is as follows: US_SN__13083311.txt, Feb. 27, 2014, and 13,974.

FIELD OF THE INVENTION

This invention relates generally to extracting information from an executing software application during execution of that software application.

BACKGROUND OF THE INVENTION

When one designs a software application, it is often desired to extract or gather information related to how the application is running. Some currently available data-gathering applications provide data to logs that can be viewed in near real-time or after the program executes, however this type of information gathering and analysis has limitations.

It is generally known that the more information that is gathered from an active executing software application in production the more the active executing software application is affected. Changes in the behavior of an executing software application may be appropriate in a development or test environment; however, changes due to the act of information extraction are rarely acceptable in a production environment where the application is used for its intended purpose. As a result one often minimizes or limits the amount, detail and breadth of information available from an application in production so as to affect the executing software as little a possible even though extracting more information may be preferred. This then relegates the executing software application to that of a black box making it very difficult to accomplish anything close to effective IT operations. In the past attempts have been made to extract and gather information from an executing software application with either little information being available or an unacceptable degradation in performance while executing of the software application. The act of gathering information from an executing software application normally resulted in adding overhead to the application by way of significant interruptions to the normal flow of execution and additional obtrusive software instructions, which in turn changed the way the application behaves. This is what is known as "the collection problem".

Information extracted from an executing software application has utility in a number of disciplines. Detailed information from a software application executing in production is highly valued to information technology (IT) operations, IT planning, software development activities, and security controls. Despite the overwhelming value and need for detailed application information, the state of the art is such that incomplete information is gathered by sampling predefined points at intervals, or by analyzing information that is indirectly related to an application which infers application behavior.

In most IT operations the information that is required is indeterminate and is therefore not known in advance. In such cases it is required to gather a wide range of data. Such is the case with application details. If it were possible, it would be useful to gather any and all data from any and all applications. With this mind it is necessary to gather a broad range of data in such a way that the application does not change as a result of the extraction of information.

BRIEF SUMMARY OF THE INVENTION

In accordance with this invention a method of extracting information from a first software application as the software application executes is provided in a computer system, having a processor and memory, wherein the memory includes a shared memory, wherein the method comprises:
  a) loading one or more of the plurality of libraries and a first library into the shared memory, wherein the first library includes software for extracting the information;
  b) executing instructions within the first software application in the absence of executing any I/O instructions;
  c) using an intercept, causing the instructions within the first library for extracting the information that were loaded into the shared memory to be inserted into an execution path of the first software application;
  d) extracting the information while instructions within the first library are executing by placing the information into the shared memory; and,
  e) exporting the information by using a second software application to distribute the information from the shared memory to another location.

In accordance with the invention there is further provided, a method of extracting data from an executing software application without polling in an aperiodic manner comprising:
  placing software instructions in the form of a library for extracting information in a shared memory space of the executing software application and executing said software instructions in the process of executing the software application while ensuring that I/O is not utilized by in the process of executing the software instructions for extracting information and displaying graphs compiled from information extracted by the software instructions which provide visual information related to the execution of the software application.

In accordance with another aspect of the invention a system is for extracting information from an executing software application that requires a plurality of libraries, a processor, and memory for execution, wherein the memory includes a shared memory, the system comprising:
  a) a software application characterizing library;
  b) software instructions to configure a loader to load the software application characterizing library into the shared memory;
  c) software for retrieving from the shared memory and for exporting the extracted information to different destination;
  wherein the software application characterizing library has intercept logic for causing functions within the software application characterizing library to execute before and/or after functions or instructions within the plurality libraries, and wherein the software application characterizing library has instructions to extract information related to the executing software application and wherein I/O operations are only performed before or after instructions related to extracting the information are executing.

BRIEF DESCRIPTION OF THE DRAWINGS

Exemplary embodiments of the invention will now be described, in conjunction with the drawings in which.

DETAILED DESCRIPTION

Figure 1:
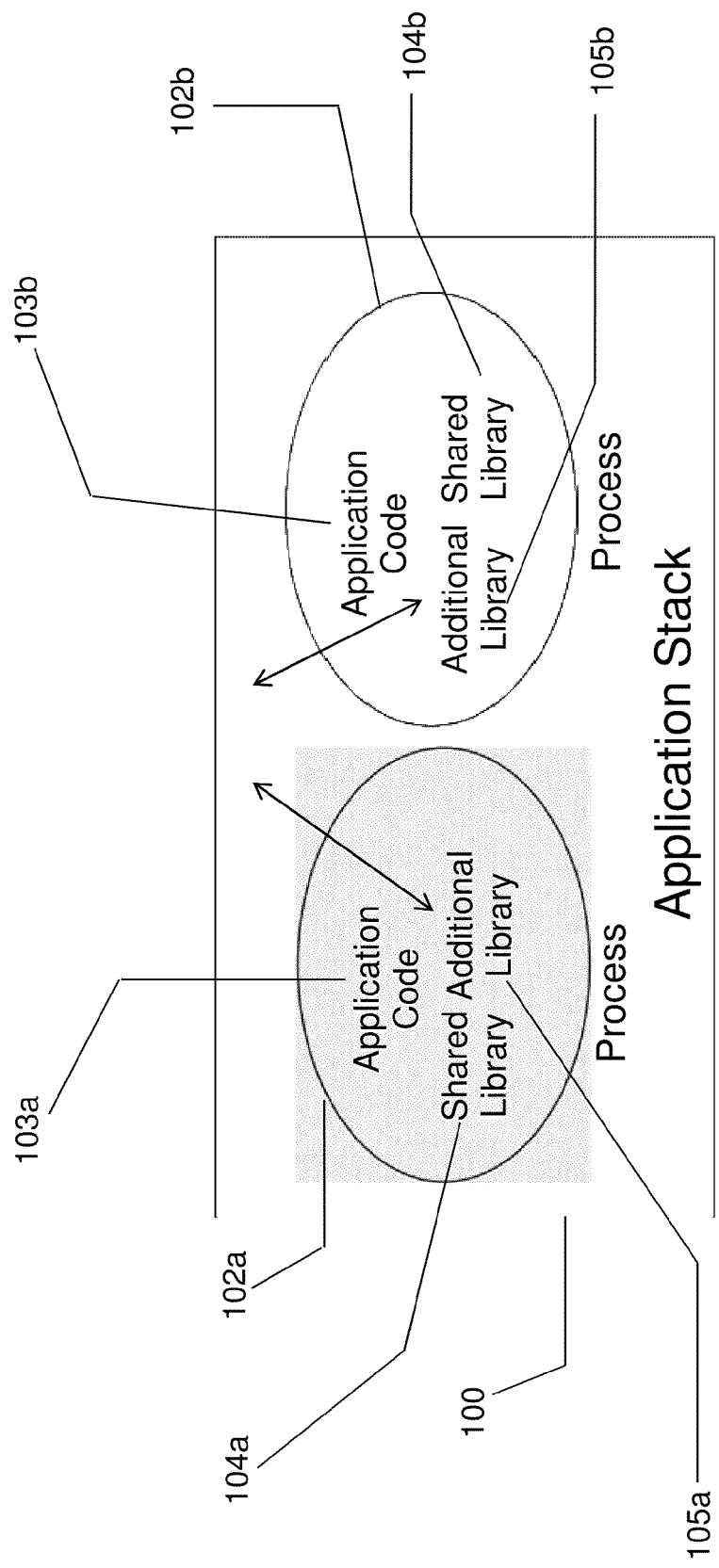
FIG. 1 is diagram of a conceptual view of an extraction method for extracting information from an executing software application wherein executable code, in the form of software instructions, is placed in the address space of one or more processes.

Fundamentally, the invention disclosed herein extracts information from within an executable software application as opposed to attempting to extract details that might be available outside of the execution of that executable software application. In accordance with a preferred embodiment of this invention software instructions that extract information are placed or reside in a virtual address space of all or most processes associated with an executing software application in the form of a shared library/DLL.

In accordance with this invention there are a set of conditions that are immutable governing the operation of all information gathering software code placed in the virtual address space of a process from which information is gathered. These conditions are all in support of a single goal; maintaining the integrity of the executable software application from which information is extracted. The fundamental behavior and performance of the executable software application cannot be changed as a result of the information extraction process.

In a preferred embodiment the following conditions are met:

I/O should not be used for information extraction from within the application from which information is being gathered;

Any instructions executed, as part of information extraction cannot incur more than 5% of CPU resources;

Any memory that is allocated in dynamic fashion must be severely limited. The limit is generally a few hundred bytes;

Any stack space used should be limited. Any stack used must conform to the size specified for the current thread;

No blocking operation can be performed. This includes any locking or synchronization method; spin locks included;

System calls can only be made from within object creation operations. This includes process and file creation. The execution of a system call has possibility of causing the process from which the system call is executed to block. System calls may be performed during initialization of the shared library/DLL. Once initialized no further use of system calls are permitted.

In a less preferred embodiment the restrictions on some of these conditions may be lessened, however, one cardinal rule that must be followed is: when the library for gathering information is loaded into shared memory and the instructions within that library execute no I/O can be used.

The term shared memory is defined as memory which is shared by and is accessible to multiple processes, wherein a process has a unique address space. An example of a process would be word processor application, or a spread sheet application. The term I/O includes but is not limited to, reading or writing from files, sending or receiving messages on a network, displaying information on a terminal, or sending information to a printer. With regard to this invention shared memory segmented one or more blocks that are used for storing libraries and one or more other blocks for storing the extracted information.

In accordance with this invention very detailed information can be extracted from software applications executing in production environments without any noticeable change to the software application from which information is extracted. There is no longer any need to limit the amount of information available from production applications.

Turning now to FIG. 1 a conceptual view of the extraction method is shown. An application stack 100 is shown having two processes 102*a* and 102*b* each consisting of executable application code in the form of software instructions specific to that process 103*a* and 103*b* respectively, and shared libraries 104*a* and 104*b*. Executable code, in the additional library 105*a* and 105*b* in the form of software instructions, is placed in the address space of one or more processes. These software instructions are embodied in a shared library or dynamic linked library. This library file 105*a* and 105*b* is loaded along with other required system library files. This library 105*a* and 105*b* becomes an additional library referred to hereafter as a software application-characterizing library (SACL), which is loaded into in the virtual address space of any given process. The software instructions embodied in the SACL are used to extract information in real-time from a running process. The SACL is an additional library in addition to library files normally required to execute the software application and this additional library 105*a* and 105*b* gathers information about the software application including one or more processes 102*a* and 102*b* that are running in a nearly real-time manner. What is meant by real-time in this instance is aperiodic execution and during execution of the software application from which information is being gathered rather than polling the software application by way of interrupting execution with an interrupt such as hardware interrupts. As is well known, the use of an interrupt requires switching from user mode to Kernel Mode. In a preferred embodiment of the invention the same SACL 102*a* and 102*b* is used for all processes, although it would be possible to vary the particular behavior of the SACL if required by modifying the instructions within the SACL.

Application

The term software application is used within this specification broadly to refer to a wide variety of software. A software application from which information is to be gathered while it executes can be a word processor or spreadsheet or other application that executes on a single compute platform such as a personal computer having a memory, input output devices and storage in the form of a hard drive; or alternatively, a software application can also be multi-tiered and execute on several to dozens of compute platforms. Software applications are created in an ever-growing number of programming languages. Components of a software application very often consist of databases, application servers, web servers and caches all in support of core business logic. The term application stack is appropriately used to describe the sum of re-usable software components along with the core business logic that together comprise a software application. Technology that would be able to extract complete details from software applications and application stacks as they execute in production, as opposed to disparate information polled at intervals, would need to support any and all of the technologies used to create applications. Core business logic is related to software instructions that are distinct from common re-usable components. A re-usable component is something that can be used by any application, for example, a web server, database, app server. Core business logic therefore, is software instructions intended for a specific purpose; not general purpose nor re-usable.

Logical Model

Figure 2:
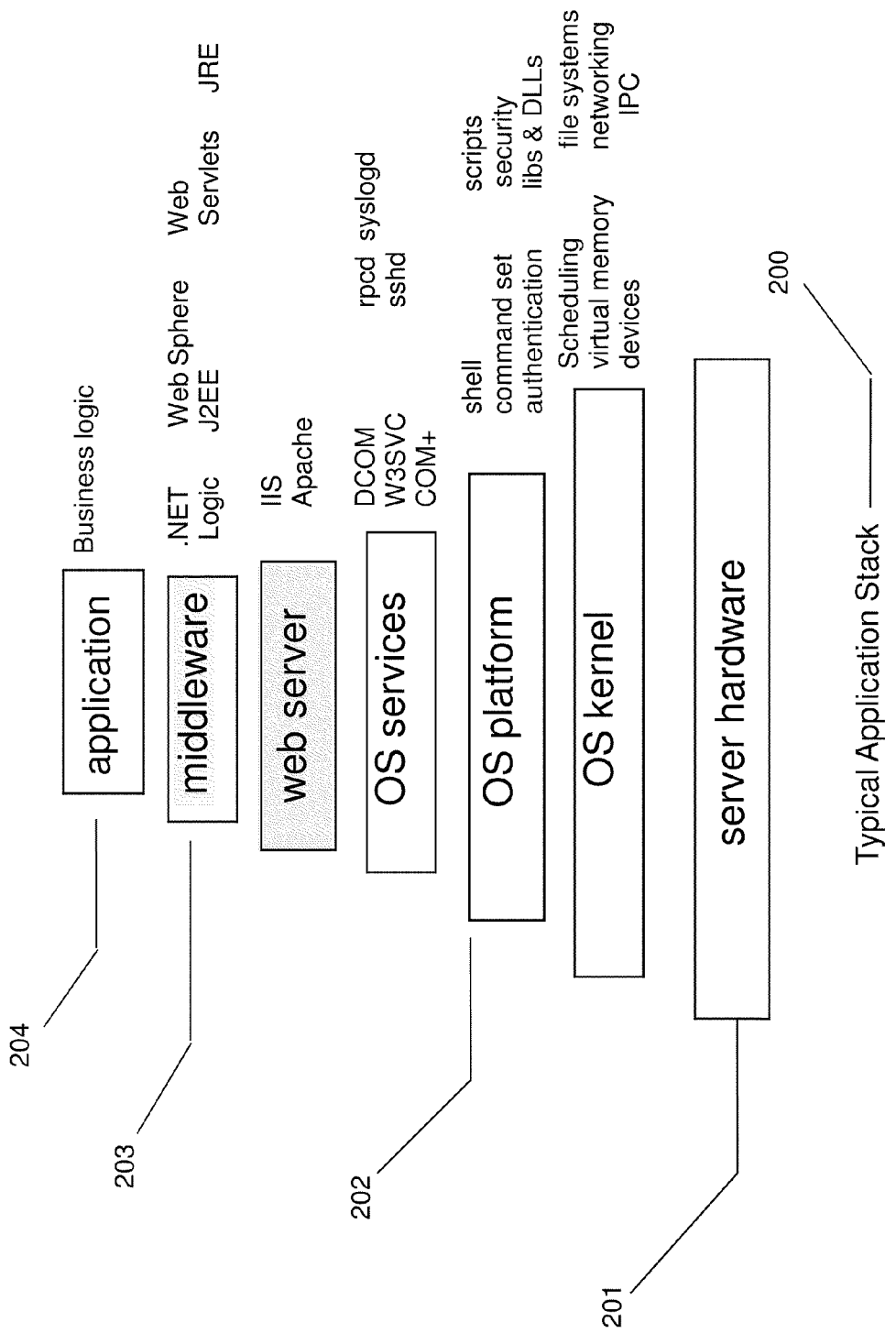
FIG. 2 is a prior art typical view of a software application stack.

Due to the complexity of software applications most texts generally describe a logical view of an application stack. The way one thinks about an application stack, the picture people most often have in their minds, is generally a logical view of the stack. While this helps us to understand the concepts and the context for any given application stack, the logical view does not depict the way in which an application stack actually performs. FIG. 2 illustrates a typical view of an application stack 200. It is common to view an application stack as a hierarchy; as layers of software where each of the higher layers are dependent on those beneath it. The software stack in its entirety executes on server hardware, 201. The operating system 202 provides access to hardware services available from the server 201. It is common practice to make use of re-usable components 203 such as a web server or other middleware. The application 204 is logic specific to a business purpose. The application 204 is dependent on re-usable components 203, an operating system 202 and server hardware 201.

Execution Model

Figure 3:
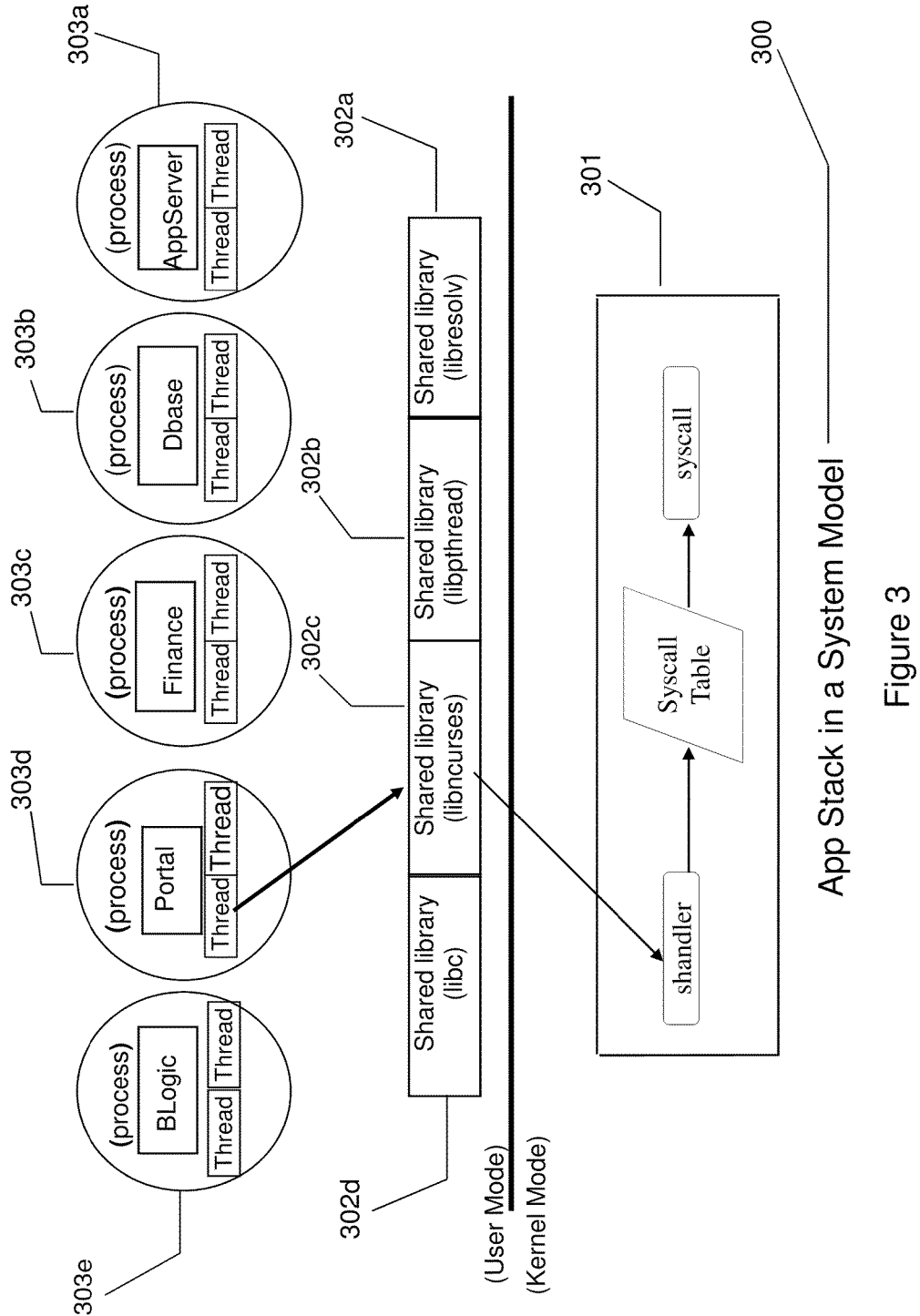
FIG. 3 is prior art process view of an application stack illustrating application interfaces exported in the form of shared libraries, or dynamic linked libraries (DLLs) wherein system call mechanisms are employed.

In order to be able to extract information from a software application without changing the behaviour of that software application, a detailed understanding of how an application stack actually executes is required. With this background one can understand that there are many thousands of interfaces available for use by an application. Referring now to FIG. 3, an application stack is shown in a system model having a plurality of processes 303a through 303e which execute making calls to one or more shared libraries 302a through 302d which in turn utilize a system call handler, system call tables and system call code embodied in a kernel 301 to effect the execution of the code in a particular shared library. It can be seen that a wide variety of application interfaces are exported in the form of shared libraries, or dynamic linked libraries (DLLs) 302a through 301d. A subset of these interfaces, those that interact directly with the operating system (OS) to obtain and manage resources, is used to extract detailed information about the behavior and performance of an application stack.

An application in most modern operating systems consists of one or more processes and there are numerous software routines that are used by multiple processes. For example, several processes 303a through 303e may find it necessary to open, read, write and close files. Rather than requiring each process to create its own version of common functionality, such as reading and writing files, shared libraries are used to provide access to commonly re-usable functionality. Therefore, any process will typically access commonly reusable software routines by means of shared libraries. A loader provided with the OS will load not only the executable, but all of the shared libraries used by a process. A process makes function calls to routines contained in shared libraries. It is common practice for functions in shared libraries provided by the OS to make system calls as opposed to an individual process directly making a system call. A system call is the mechanism 301 used by processes to access protected OS services.

Information Extraction

Conveniently this invention provides a system and method for extracting information from within a software application and for exporting the information in such a way as to ensure that software application behavior is not altered.

In operation, a software application deployed on any modern operating system (OS) executes as one or more processes, FIG. 3 303a through 303e. The OS causes the software application to execute by creating one or more processes. Processes that are able to execute, for example, those that are not blocked waiting for resources, are placed in a run queue. The OS causes processes in the run queue to execute on an available CPU resource. Each process consumes compute resources in the form of, at least, memory, CPU cycles and one or more threads. Resource usage can also include files, network, inter-process communication and/or synchronization mechanisms.

Access by a software application to system resources is provided through shared libraries or DLLs, FIG. 3 302a through 302d. When a software application is started, the program loader provided with the OS reads the associated executable file and determines which shared libraries or DLLs are referenced by the executable. The requisite libraries are loaded into memory along with the application executable files. The loader performs dynamic linking between the application executable file or files and functions exported by the libraries.

Figure 4:
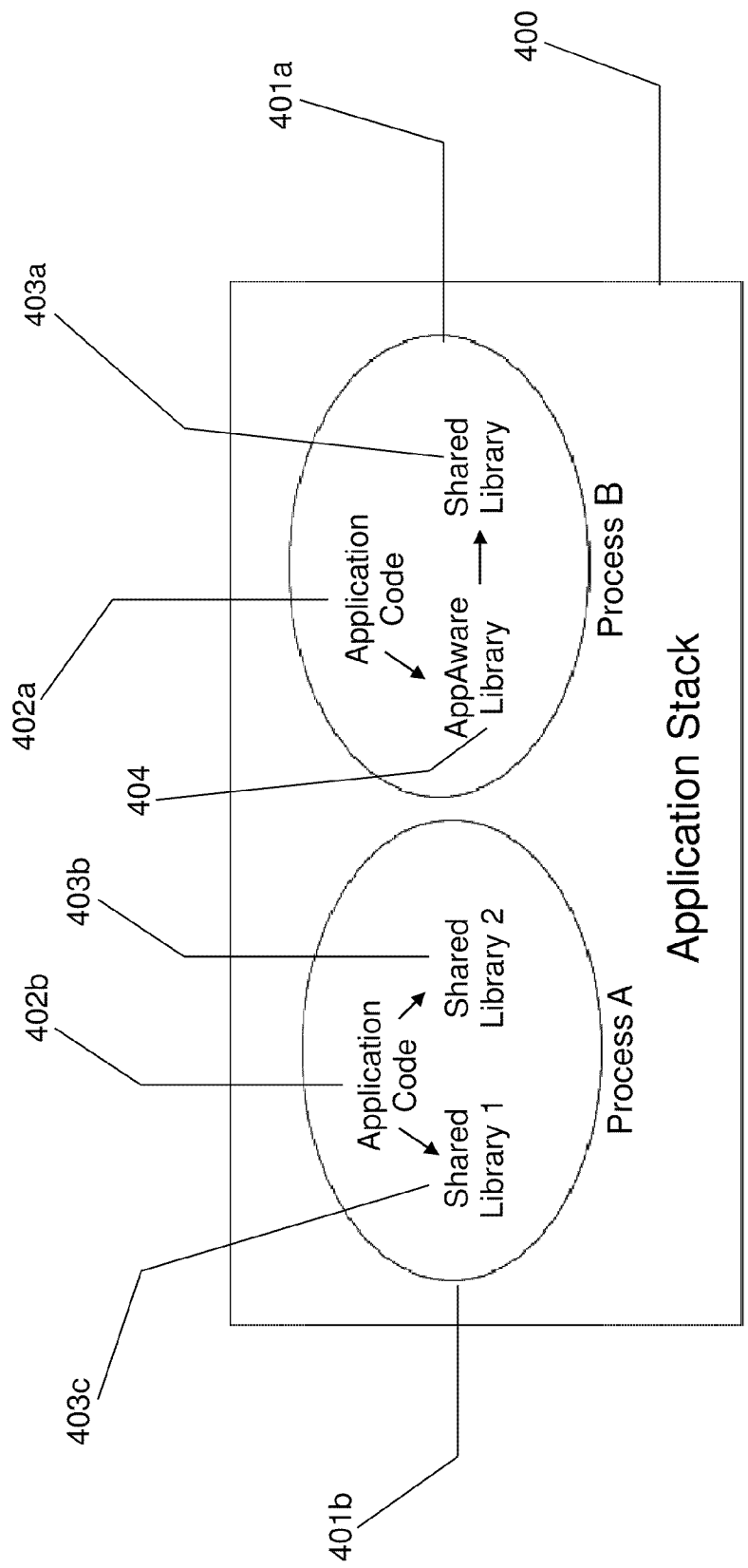
FIG. 4 illustrates an application stack having two processes running wherein process B has an AppAware library inserted into Process B for gathering information about the software application that is executing.

The program loader is configured to load not only those libraries required by the software application executable, but also the SACL. OS interfaces to cause the loader to load an additional library are available in most modern OSs. The SACL is an AppAware library. During library initialization the code exported from the SACL is placed in the execution path between the application and a subset of the functions exported by system libraries. This is illustrated in FIG. 4, where it can be seen that an AppAware library 404 is loaded into the process address space of process 401a. There are several approaches that can be taken to place code in the execution path of an application. This can be described as an intercept; by way of example if function A in a process calls function B in a shared library, an intercept causes the process to call function C in the AppAware shared library 404 which extracts information related to the software application executing and then calls function B in a shared library 403b as originally intended. An intercept can be accomplished by means of dynamic linking or patching software instructions. The result is to have the application call the function exported by the AppAware library 404 instead of the corresponding function in the system library 403a. As can be gleaned from the description above, this intercept process allows the OS to remain in USER MODE as opposed using an interrupt which requires a transition from USER to KERNEL MODE.

FIG. 4 illustrates the concept. Process A 401*b* calls functions exported by system libraries 403*b*, in a routine manner. When process B 401*a* calls the same system function it is actually calling the function in the AppAware library 404. In most embodiments of the invention the AppAware function in turn calls the corresponding function from a system library or DLL 403*a*. The use of the program loader and the AppAware software enables this change in the location of a function, from a system library 403*a* to the AppAware library 404 thereby allowing desired intercept software to query the application in situ and during execution.

The act of placing software instructions in the address space of each process that constitutes an application stack enables information to be extracted from each process associated with the software application that executes; it is a first step required to acquire information related to an executing software application. The SACL is loaded once for each process. Information is gathered on the fly. There is no prior knowledge of the application required. The behavior of the application stack from which information is extracted must not change in such a manner that individual processes associated with the application stack must not block where they would otherwise block. The act of extracting information must not in any significant manner consume resources that would affect any process associated with the application stack. This includes CPU cycles, memory, and I/O. The extraction code embodied in a shared library or DLL does consume CPU cycles and memory. However, it should not consume I/O resources. The CPU and memory consumed is small enough in both cases so as to not significantly affect the software application from which information is being extracted other than having a very short delay in the execution of the software application or a particular process from which information is extracted.

The system in accordance with this invention places all information extracted from individual processes in a shared memory segment. The shared memory 502 is not file backed, as it is a requirement of this invention that no I/O operation be performed in the act of extracting information from a running software application in a production environment.

Figure 8:
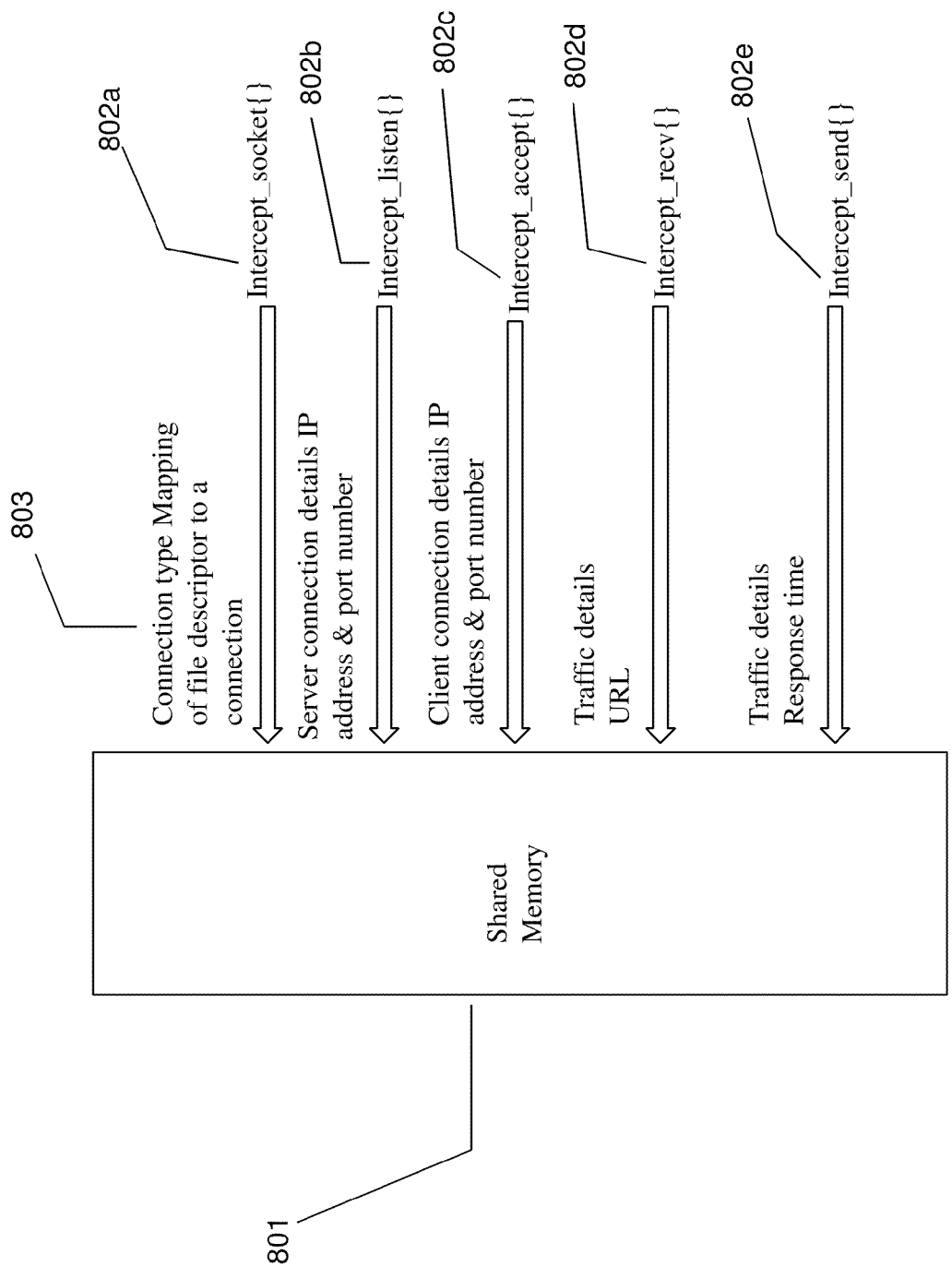
FIG. 8 is a diagram illustrating a case study of a network service, showing that the aggregate of all information collected from every network operation represents a complete description of a network service.

Once the instructions exported from the SACL are placed in the execution path it is able to extract information from functions that are called by the executing software application. FIG. 8 offers an example in the form of a case study of a network service. This represents a set of socket operations performed 802*a* through 802*e* by a server in a client server model. SACL code, shown in FIG. 8 as intercept functions 802*a* through 802*e* extracts details from parameters passed to socket functions from application code as well as values returned from socket functions to application code. FIG. 8 illustrates the information extracted from each socket function. It can be seen that a very complete description of a network service can be extracted by culling information from various socket functions.

Referring more specifically to FIG. 8 the ability to obtain information from numerous, potentially disparate, operations enables a very concise and accurate description of application operation. FIG. 8 provides the example of a network service, wherein such a service is the server component of a client-server network model. It can be seen that the aggregate of information 803 gathered from the network operations 802*a* through 802*e* performed by a service describes in concise detail the operation of such a service. The aggregate information 803 includes the following details for each and every network connection:

Server IP address
Server port number
Client IP address
Client port number
Protocol used (e.g. TCP or UDP)
Connection type (e.g. AF_INET or AF_LOCAL)
Network traffic described as number of bytes received
Network traffic described as number of bytes transmitted
Network response time
Protocol specific values (e.g. URL from an HTTP connection)

A separate process 503 is used to read the extracted information and distribute the information as needed. This separate process, called a collector 503, is normally embodied as a daemon process or a service. As a daemon or background service the collector starts automatically when the OS is booted.

Figure 5:
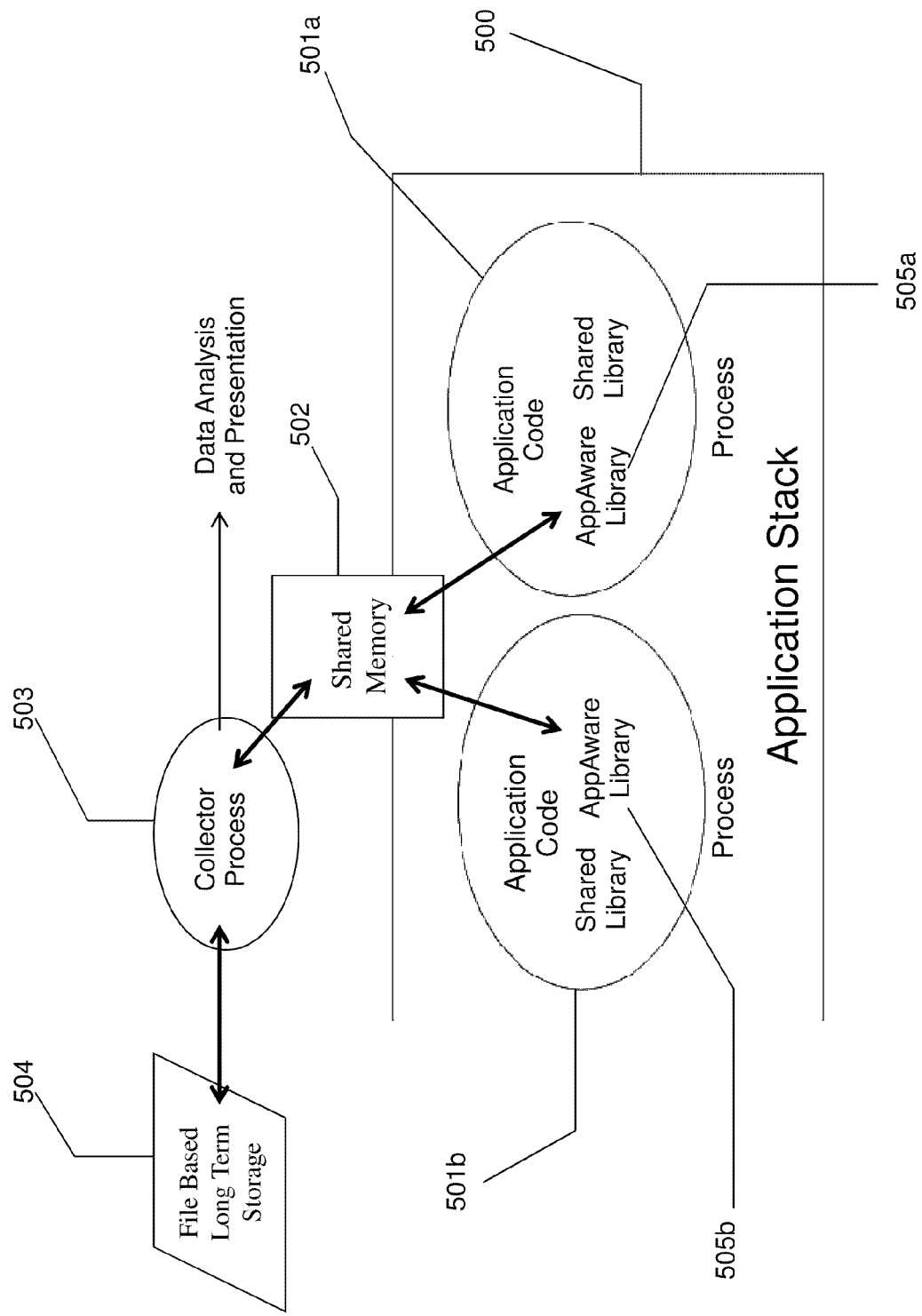
FIG. 5 shows the application stack of FIG. 4 further illustrating the software code embodied in the AppAware library placing information extracted from individual processes into shared memory and illustrating a collector which makes the extracted information available to a separate data analysis operation intended for user presentation.

It can be seen from FIG. 5 that the software code embodied in the AppAware library, places information extracted from individual processes into shared memory 502. The collector process 503 reads the information made available from all processes from which information is being extracted on a single OS. The collector process 503 makes the extracted information available to a separate data analysis operation 605 intended for user presentation. The extracted information can optionally be stored in files 504.

The extracted information processed by the collector process 503 is buffered locally, as shown in file based storage 504, until it can be either transported or utilized locally by an analysis operation; and, local buffering is accomplished with the use of files, and the size of any local storage 504 is limited so as to not to adversely affect the local OS.

The collector 602*a* through 602*c*, in a particular embodiment, transmits the extracted information from a local buffer to an external server 604 and 605. In most cases this is implemented as a network operation using network protocols, most often HTTPS over TCP. In this manner an upload time duration can be specified that defines the interval in which the extracted information is transmitted. Therefore there are two distinct elements; software instructions in the SACL Appaware library 505*a* and 505*b*, as well as a separate daemon process 503. Because the software instructions in the SACL 505*a* and 505*b* are placed inside another process no I/O can be used when instructions related to the SACL are being executed. However the daemon process is an independent application and it may use I/O. The SACL 505*a* and 505*b* reside in a segment of the shared memory that is different from the segment represented by 502.

It is not uncommon for software application stacks to exist on any number of physical and/or virtual servers. The emergence of viable cloud computing options enables components of an application stack to exist on compute platforms in a public cloud, a private cloud or hosted in local compute resources on premises, in virtually any combination thereof. Information extracted from an application stack must be gathered in such a way as to encompass any number of compute platforms in any location or configuration.

Figure 6:
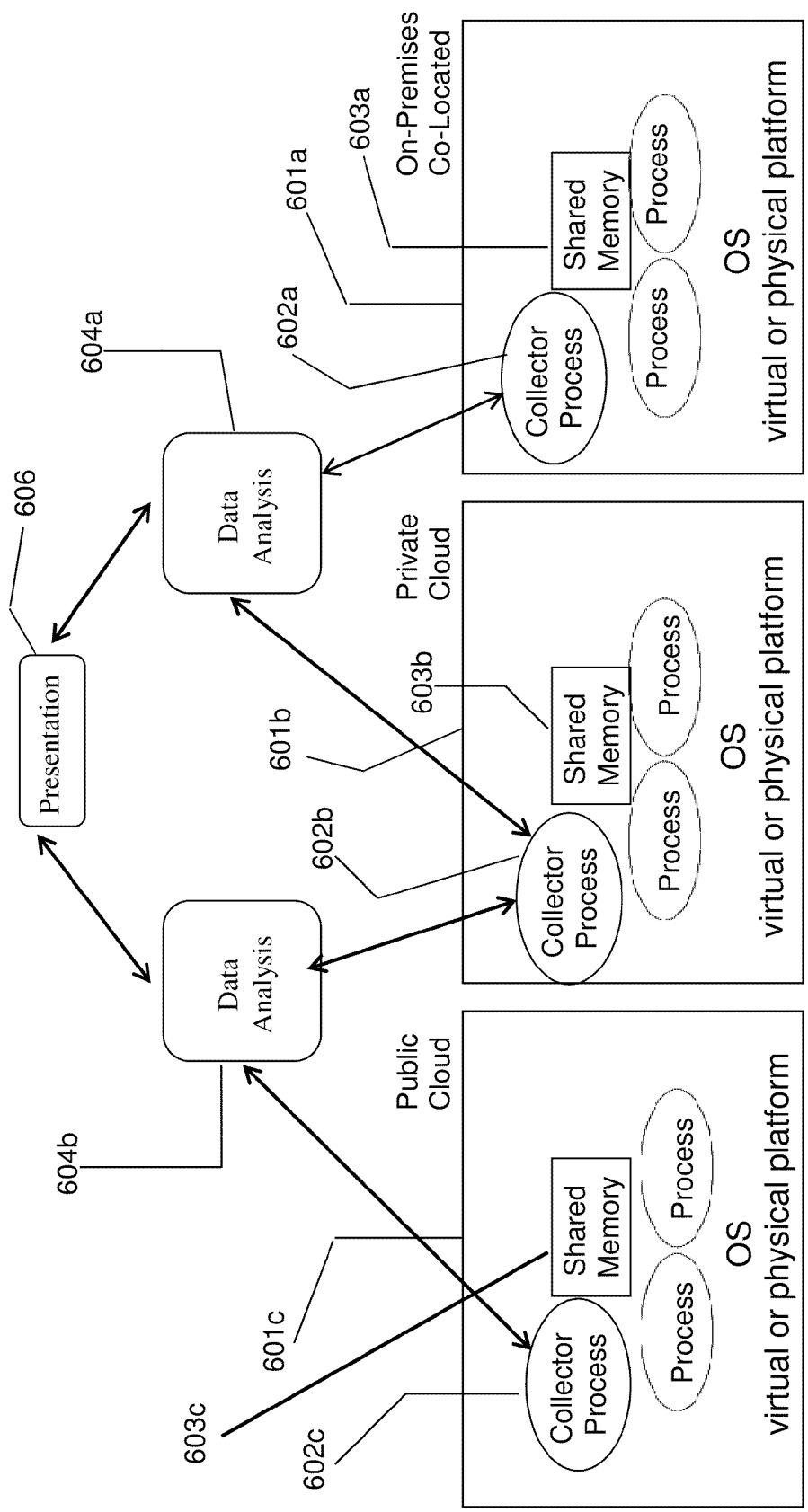
FIG. 6 is a block diagram illustrating the distributed nature of information extraction and delivery where information is collected from individual processes on one or more OSs.

FIG. 6 illustrates the distributed nature of information extraction and delivery. Information is collected from individual processes on one or more OSs. Each OS can exist in a physical or virtual platform 601*a*, 601*b* or 601*c* each having a shared memory segment 603*a*, 603*b*, and 603*c* respectively. Multiple OSs can exist within any number of disparate locations and configurations, including, but not limited to, public clouds, private clouds and compute resources on-premise or co-located.

FIG. 6 further illustrates a collector 602*a*, 602*b* or 602*c* in each OS able to transmit all extracted information to external resources for data analysis 604*a*, 604*b* and presentation 606. Collectors 602*a*, 602*b* or 602*c* are able to export extracted information to one or more remote network endpoints or to one or more local processes. This is essentially an extension of the stand-alone single OS system described heretofore.

Data Model

All information extracted from software applications is placed in shared memory 502. Specific handling is applied to a data model such that the information can be contained in the shared memory segment 502. The method applied includes the following steps:

Determine the Data Model to be Used
Based on how data is to be visualized define a model for what data is to be collected
For this data define an organization, an ordering of the data
Example; a hierarchical structure is desired where process data is the top of the hierarchy and resources used by the process are subordinates
Define the Layout of Shared Memory
Determine which application or system objects information will be extracted from example; processes, files, sockets, threads, memory
Define data elements corresponding to each object example; with sockets the following data elements are required:
    local IP local port
    remote IP remote port
    socket descriptor
    bytes sent
    bytes received
    transaction time
    response time
example for files the following data elements are required:
    path name
    file descriptor
    bytes written
    bytes read
For each data element to be collected classify data as:
    fixed size
    variable size
    list
Organize data such that extraction code writes to the shared memory and an external application reads from shared memory
    No locking mechanism can be used to manage concurrent access
Determine an amount of memory needed for any expansion
    For each data element define any expansion potential
    Place reserved data in blocks to allow for expansion
Calculate the Size of the Shared Memory Block
Data elements of type list are defined as distinct space with a pre-determined number of elements
Numbers of elements are determined by the type of information represented in the list
Apply data minimization where possible
    Example; use descriptors and/or handles to identify an object of variable length wherever possible
Initialize the Shared Memory Block
Populate the Shared Memory Block
As the application executes gather information
Segregate the information into the defined data elements
Locate the proper offset in the pre-determined data layout for the specific data elements
Update the shared memory block with collected data elements Execution Model In order to consider the possibility of becoming very efficient at IT operations on a broad scale it is necessary to translate that which successful organizations have accomplished with custom environments into re-usable capabilities. A detailed examination of successful organizations reveals that these organizations make use of a very specific view of an application, obtained from aperiodic (not polled) data sources. In contrast to the data provided by this invention, prior art systems use facilities provided by an application subsystem/component to collect information from outside the executing app. These consist of logs and/or statistics and are limited to collection of information that has been pre-defined by the app itself.

Developers typically consider a software application as architecture with multiple sub systems where each sub system consists of; objects, classes, and methods. However, this is an abstract view of an application, which does not reflect the real or actual manner in which an application executes.

Figure 7:
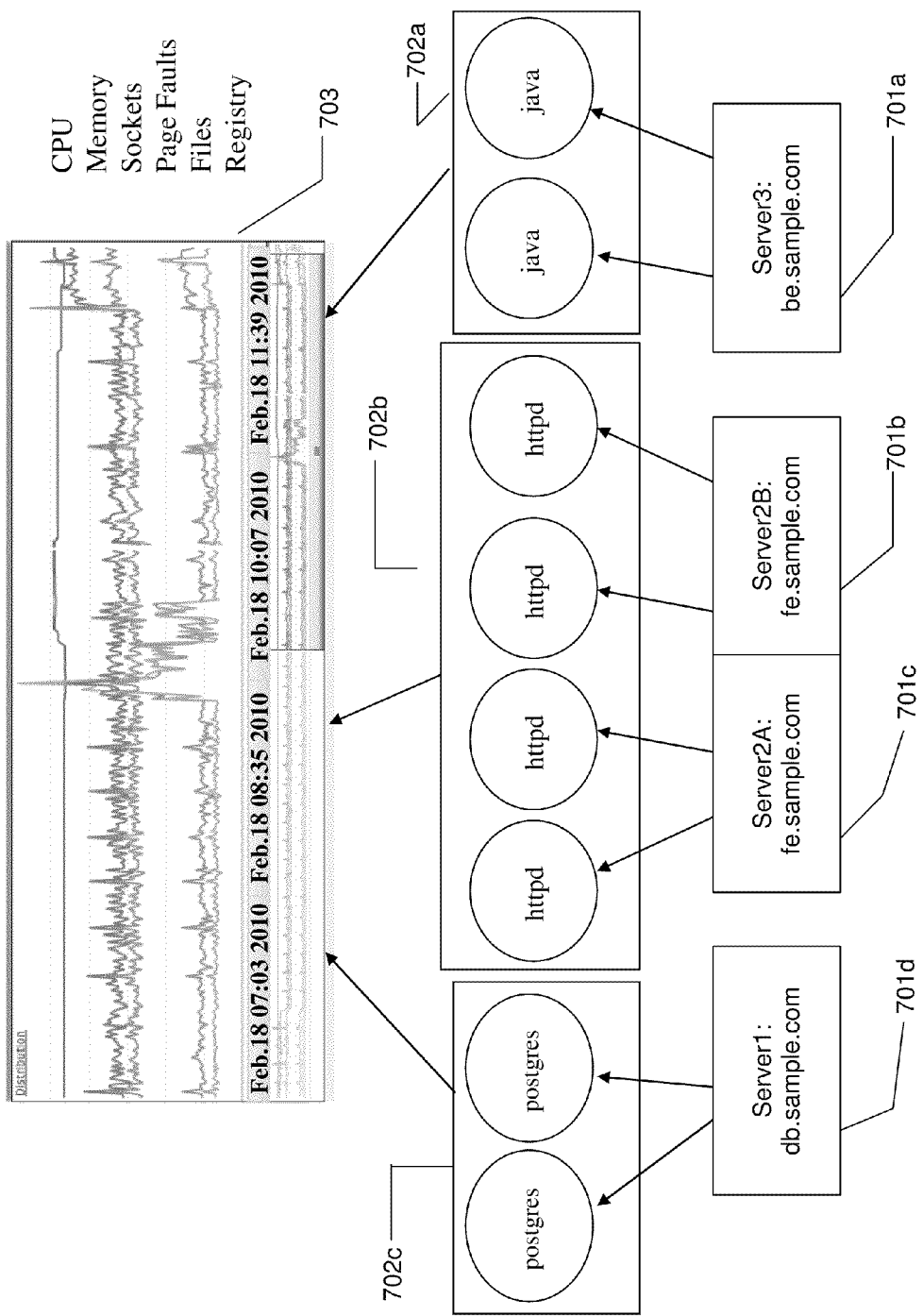
FIG. 7 is a diagram illustrating visualization in accordance with the invention of an application having multiple subsystems in which each subsystem consists of multiple processes executing on multiple servers.

It's common for operations personnel to consider a software application in the context of the server that hosts the software application. This is an indirect view of an application. From information extracted from the OS it is possible to create a view of the overall server behavior and resource requirement. By way of example there are three views of a software application as it executes in an active IT environment. A first view is a software view related to how software developers envisage a software application; a second view is a server view as imagined by system administrators and a third view as provided by this invention, and illustrated in FIG. 7, is a view of the actual representation of the executing software, a view defined by this invention. This third view is a view of software as they execute in an active IT environment. This is shown in FIG. 7. Given that all software applications exist as one or more processes, 702*a*, 702*b* and 702*c* describes a view of an application as x processes on y servers. Where x and y are >=1. For example, a web server may exist as 10 processes each on 3 servers 702*b*. The invention creates a view of 30 processes that spans 3 servers 702*b*. This view 703 presents a very accurate and meaningful way of visualizing an application with all of its component elements that represents the actual representation of the executing software. In FIG. 7 703 therefore provides a snapshot of each process across y servers 702*a*, 702*b* and 702*c* and provides a near real-time view 703 of the information about each process that executes. Turning now to FIG. 7 a number of servers 701*a* through 701*d* are deployed to support the needs of an application. The application represented as 3 sub-system components 702*a*, 702*b* and 702*c* consist of a postgres database 702*c* a web server 702*b* and Java code 702*a*. Each subsystem component 702*a*, 702*b* and 702*c* consist of 8 processes executing on 4 servers. A view that describes this representation is created by aggregating extracted information from the processes associated with each subsystem component 702*a*, 702*b* and 702*c*. This view enables interaction with each subsystem component as a collection of x processes on y servers.

In order to obtain an accurate representation of an executing software application, one that represents the actual representation of the executing software application as it is deployed in an operational IT environment, without the need to create a fully customized environment it is necessary to define a means to extract details of an application in a repeatable manner. This may be accomplished independent of specific application type, language, architecture and design approach. An application's execution model 702*a*, 702*b* and 702*c* reflects the resources used for the application alone, independent of the OS. It reflects how the application executes, independent of code specifics and language details. With such a model the real view of an application, its profile, can be created in a repeatable manner for any application independent of the software code and language. The execution model is created using aperiodic data extracted as the application executes. There is no need to poll sources to create data.

Software applications consist of one or more processes where each process owns the resources, that is, gains exclusive access to a resource necessary for a component to perform its defined function. Threads execute code and consume CPU resources. Memory is required for fast access to both code and data store. Sockets are used to create and manage network connectivity. Files are used to manage persistent state. This composition holds for application stacks and their components independent of application type, language, architecture and design approach. An execution model is a representation of the application, as it exists while it is executing. It includes comprehensive details for a set of processes, threads, sockets, files and more that make up an application. The specific data set that comprises an execution model is specific to the application stack, including all components, the model represents the application as a whole and or individual components. In order to create a view of an application as it executes, to show the actual representation of the executing software application it is necessary to create a view that reflects resource requirements and detailed activity.

Data Definition

Grouping collected data from individual processes creates an execution model. Collected data is organized in a hierarchical fashion with a process as the root and resources associated with the process as subordinate data elements.

The data required to create an execution model includes:
Process
  Process ID
  Process Name
  File Read
  File Write
  Socket Read
  Socket Write
  Number of Sockets
  Threads
    Thread ID
    Start address
    Stack size
    Thread state
    Start time
    End time
    Kernel time
    User time
  Sockets
    Socket descriptor
    Thread ID
    Local IP address
    Local port number
    Remote IP address
    Remote port number
    Start time
    End time
    Response time
    Socket type An example of a data set that defines an execution can be seen in XML format in the computer program listing appendix, which is referenced above in the section of this specification entitled "Reference to a Computer Program Listing Appendix," which has been incorporated by reference herein, and which has been submitted via the United States Patent Office Electronic Filing System herewith.

Streaming

The utility of an execution model is greatly enhanced where the application details are presented in visual form. In order to support this, the invention transports the data to a compute infrastructure that is capable of creating the necessary visualization. In one embodiment the invention transmits execution model data using the HTTPS protocol over TCP.

The compiled execution data is transmitted to visualization infrastructure at regular intervals. A reasonable interval may be every 20 seconds. An application separate from the application from which execution model information is being extracted is used to compile the data, format it, in one embodiment an XML format is used, and transmit XML files to a remote server.

Data Processing

In order to visualize an execution model the raw data extracted that defines the execution model can be summarized. Data can be summarized in a time series. The execution model data can be organized by minute, hour and day periods. In some embodiments the raw execution model data can be accessed directly for specific data values.

ADVANTAGES

The system and method shown and described with reference to FIGS. 4 through 8 provide the ability to extract information from any application as the application executes in a production environment. An application can exist in any form; as a single process, as a group of processes, as a collection of components, where each component embodies a collection of processes. Moreover, the invention is able to support application stacks implemented in any programming language and designed in any architecture. This includes, by way of example, but is not limited to, custom business logic, application servers, web servers and databases. Information is extracted in real-time; as the application executes and not sampled at intervals.

By way of example, the following code snippet shows an example of an intercept operation for the network send operation.

```
ret = libc_send(sockfd, buf, len, flags);  ← libc_send is a pointer to the send( ) function in the system library
    if (g_include && ret != -1) {
        for (i = 0; i < SOCK_PER_PROC; i++) {  ← locate the mapping of a socket to a file descriptor, from a previous socket( ) operation
            if ((proc->socket[i].sd == sockfd) &&  ← the proc object here points to a shared memory segment
                (proc->socket[i].flag & AF_SOCK_OPEN)) {
                proc->socket[i].sockWR += ret;  ← add to the number of bytes transmitted for this connection
                if ((proc->socket[i].flag & AF_SERVER) &&
                    (proc->socket[i].start_resp != 0)) {
                    uint64_t resp_time;
```

```
            if ((resp_time = af_timer_now((proc->socket[i].start_resp))) != 0) {
                proc->socket[i].total_resp_time += resp_time; ← calculate the response time
that started from a previous receive, recv( ), operation
                proc->socket[i].num_resps += 1;
            }
            memset(&(proc->socket[i].start_resp), 0x0, sizeof(uint64_t));
        }
        break;
    }
}
proc->sockWR += ret; ← add to the number of bytes transmitted & received for the
process (in addition to that for each connection)
    proc->send_num += 1;
}
```

As a further example the following code snippet describes the intercept operation for a file read operation.

```
    len = libc_read(fd, buf, count); ← libc_read is a pointer to the read( ) function in the
system library
    if (g_include && (len != −1)) {
        if (!af_test_bit(fd, g_socklist)) { ← determine if the file descriptor is associated to a
file or a socket as defined by a previous open( ) or socket( ) operation
            g_self->fileRD += len; ← add to the number of bytes read from the file
        } else {
            g_self->sockRD += len; ← if the file descriptor is associated with socket, then
update connection details
            g_self->recv_num += 1;
            for (i = 0; i < SOCK_PER_PROC; i++) {
                if ((g_self->socket[i].sd == fd) &&
                    (g_self->socket[i].flag & AF_SOCK_OPEN)) {
                    g_self->socket[i].sockRD += len;
                if ((g_self->socket[i].flag & AF_SERVER) &&
                    (g_self->socket[i].start_resp == 0)) {
                    af_timer_click(&(g_self->socket[i].start_resp));
                }
                    break;
                }
            }
        }
    }
```

What is claimed is:

1. In a computer system, having a processor and memory, a method of extracting information from a first software application within the memory having a plurality of libraries, as the first software application executes, comprising the ordered steps of:
   a) configuring a dynamic loader to load one or more of the plurality of libraries and a first library into the memory, wherein the first library includes software for extracting the information;
   b) causing the dynamic loader to load the one or more of the plurality of libraries and the first library into the memory;
   c) using an intercept without using an interrupt so as to cause the instructions within the first library for extracting the information that were loaded into the memory to be inserted into an execution path of the first software application;
   d) executing in user mode all instructions in the first library for extracting information, in the absence of executing any I/O instructions, and without locking or synchronization operations;
   e) extracting the information while instructions within the first library are executing by placing the information into the memory; and,
   f) exporting the information by using a second software application to distribute the information from the memory to another location.

2. A method as defined in claim 1, wherein instructions executed within the first library related to extracting the information consume less than 5% of CPU resources available for the first software application to execute.

3. A method as defined in claim 1, wherein memory that is allocated in dynamic fashion during the execution of the software within the first library is less than 500 hundred bytes.

4. A method as defined in claim 1, wherein the step of exporting is performed while the first and second software applications are in a same run queue.

5. A method as defined in claim 4, wherein information extracted from the first software application is organized by memory management software within the first library to accommodate extracted information which is of variable length to reside in a memory of a fixed size.

6. A method as defined in claim 5, wherein the second software application extracts the information from the one or more shared memory segments so that the information is available for further processing.

7. A method as defined in claim 5, wherein the first and second software application are in a same run queue.

8. A method as defined in claim 1, wherein the first software application is comprised of processes that are loaded into the shared memory during execution of the first software application and wherein in step (c) the intercept causes instructions associated with the first application that would have been executed not to be executed until all instructions within the first library have been exectuted.

9. A method of extracting data from an executing software application without polling and in an aperiodic manner comprising: placing software instructions in the form of a library for extracting information in a shared memory space of the executing software application and using an intercept so as to execute said software instructions in the process of executing the software application while ensuring that I/O instructions are not performed in the process of executing all of the software instructions for extracting information, and displaying graphs compiled from information extracted by the software instructions which provide visual information related to the execution of the software application before the executing software application completes its execution.

10. A system for extracting information from an executing software application having a plurality of libraries running on a computer having a processor and memory that includes a shared memory, the system for extracting information comprising:
   a) a loadable and readable software application characterizing library;
   b) executable software instructions to configure a loader to load the software application characterizing library into the shared memory;
   c) software for retrieving from the shared memory and for exporting the extracted information to another destination;

wherein the software application characterizing library has intercept logic, which does not use any interrupt, for causing functions within the software application characterizing library to execute before or after functions or instructions within the plurality libraries, and wherein the software application characterizing library has instructions to extract information related to the executing software application, and wherein the software application characterizing library has instructions for placing the extracted information into the shared memory, and wherein the software application characterizing library is absent any I/O instructions.

11. A system as defined in claim 10, wherein the software application characterizing library; and the software instructions to configure the loader to load the software application characterizing library into the shared memory are stored in a recording medium.

12. A system as defined in claim 10, wherein the software application characterizing library; and the software instructions to configure the loader to load the software application characterizing library into the shared memory reside on a server for transmission over the internet.

13. A system as defined in claim 10, further comprising software for analyzing and graphing the extracted information stored in the other destination, wherein the graphical information depicts the software application as a collection of processes executing on plurality of servers.

14. A system as defined in claim 10, wherein a plurality of processes running on plurality of servers are aggregated into single set of data.

* * * * *